Sept. 13, 1932.   E. L. LAUNDER ET AL   1,877,408
BRAKE OPERATING MECHANISM
Filed April 3, 1931
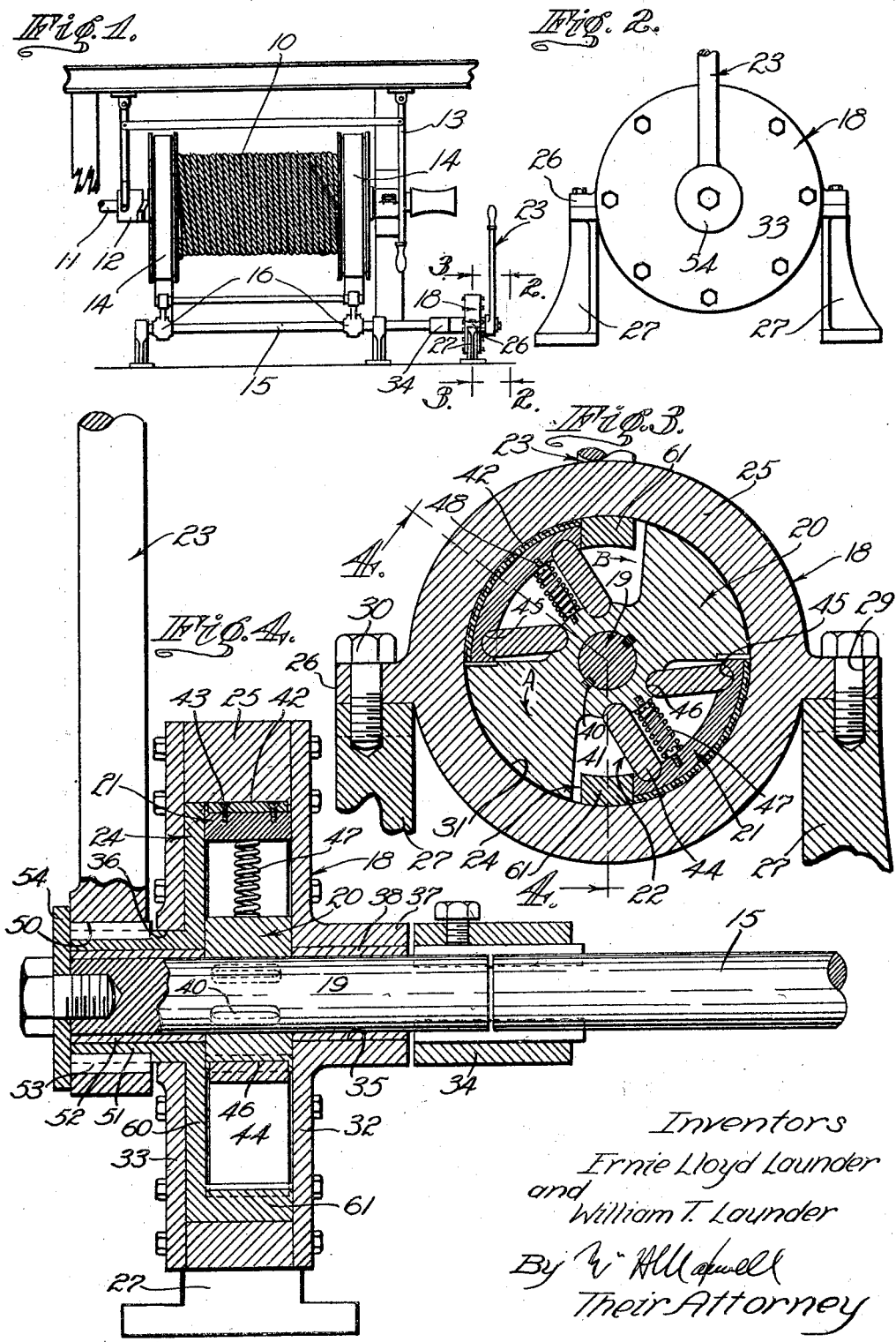
Inventors
Ernie Lloyd Launder
and
William T. Launder
By W. H. Maxwell
Their Attorney Patented Sept. 13, 1932

1,877,408

UNITED STATES PATENT OFFICE

ERNIE LLOYD LAUNDER, OF MONTEBELLO, AND WILLIAM T. LAUNDER, OF ANAHEIM, CALIFORNIA

BRAKE OPERATING MECHANISM

Application filed April 3, 1931. Serial No. 527,460.

This invention relates to brake mechanisms, and relates more particularly to the operating mechanisms of brake means of the character employed in connection with the hoisting drums of well drilling apparatus, or the like.

The type of brake mechanism usually employed for controlling the hoisting drum of well drilling equipment includes one or two brake bands for co-operating with flanges on the hoisting drum, and an operating shaft operable by pivoting or partial rotation to bring the bands into and out of braking engagement with the flanges. There are certain phases of operation of this class of mechanism in which the brake bands have a tendency to bind on the brake flanges and cause the operating shaft and its handle to kick or fly back rapidly and with considerable force. This reflex action or kicking back of the operating handle is extremely objectionable and dangerous for the operator.

It is a general object of the invention to provide a safe, dependable operating means for a hoisting drum brake mechanism in which the operating handle cannot be shifted by reflex action of the braking parts.

It is another object of the invention to provide a brake operating mechanism of the character mentioned that provides a positive, effective connection between the shaft of the brake mechanism and the operating handle.

Another object of the invention is to provide a brake mechanism of the character mentioned that may be embodied in various types of brakes, or that may be embodied in the form of an attachment for use with brake mechanisms of various types.

It is another object of the invention to provide a brake control or operating device of the character mentioned that is simple and inexpensive of manufacture and that may be applied to a brake mechanism without modification or alteration of the mechanism.

Other objects and features of our invention wil be best and more fully understood from the following detailed description of a typical form and aplication of the invention, throughout which a description reference will be had to the accompanying drawing, in which:

Fig. 1 is a view of a typical hoisting drum and the brake means therefor, illustrating the device provided by the present invention in connection with the brake means. Fig. 2 is an enlarged view of the outer end of the device, being a view taken as indicated by line 2—2 on Fig. 1. Fig. 3 is an enlarged vertical detailed sectional view taken as indicated by line 3—3 on Fig. 1, and Fig. 4 is an enlarged sectional view taken as indicated by line 4—4 on Fig. 3.

The brake controlling or operating device provided by the present invention is adapted to be embodied in forms for installation in various types of hoisting drum brakes as initially constructed or manufactured or in the form of an attachment to be applied to a brake mechanism. In the drawing, we have illustrated a typical brake mechanism for controlling the winding or hoisting drum of a well drilling apparatus and have illustrated the device provided by this invention embodied therein or applied thereto. It is to be understood that the invention is not to be taken as restricted to the particular form or application about to be described, but is to be taken as including any features or modifications that may fall within the scope of the claims.

The hoisting drum and brake mechanism illustrated in Fig. 1 of the drawing includes, generally, the hoisting drum 10 carried on a shaft 11, a clutch 12 for connecting the drum with the shaft for rotation, operating means 13 for the clutch, brake bands 14 for co-operating with flanges at the opposite ends of the drum 10, a horizontal brake operating shaft 15, cranks or levers 16 on the shaft 15 for operating the bands 14, and various other parts common to equipment of this general character. The operating shaft 15 is adapted to be turned or partially rotated to operate the bands 14 into and out of braking engagement with the flanges of the drum 10.

The mechanism provided by this invention includes, generally, a stationary body or housing 18, a shaft 19 extending through the housing 18 and adapted to be connected with the shaft 15 of the brake mechanism, a rotor 20 fixed on the shaft 19 within the housing 18, brake shoes 21 for engaging or co-operating with the housing 18, toggle means 22 flexibly connecting the brake shoes 21 with the rotor 20 whereby movement of the rotor in one direction relative to the housing causes the shoes 21 to frictionally engage the housing 10 and prevent further movement of the rotor, an operating handle 23, and means 24 connected with the handle 23 for co-operating with the brake shoes 21 to cause the release of the brake.

The housing 18 is the fixed or stationary element of the mechanism and is adapted to be mounted at a suitable point in axial alignment with the shaft 15 of the brake mechanism. In the particular case illustrated in the drawing, the body 18 is arranged or mounted on the floor at a point spaced from the outer end of the shaft 15. The body or housing 18 includes a cylindrical tubular central or main part 25. The main part 25 of the housing may be provided with diametrically opposite mounting ears or flanges 26. The ears or flanges 26 are adapted to seat on spaced brackets or supports 27 for carrying the housing 18. Openings 29 may be provided in the ears 26 for passing screws 30 for connecting with the brackets 27. The opening 31 in the main part 25 is preferably concentric with the central axis of the housing and may be provided with smooth axial walls. Cover or end plates 32 and 33 close the opposite ends of the main part 25 of the housing.

The shaft 19 extends centrally or axially through the housing 18 and is provided to carry the rotor 20 and operating handle 23. In accordance with the broader principles of the invention, the shaft 19 is in the nature of an extension or continuation of the shaft 15 of the brake mechanism. It will be readily apparent that the shaft 19 may be an integral continuation of the shaft 15 or may be a comparatively short part connected with the shaft 19 in a suitable manner. In the embodiment of the invention illustrated in the drawing, the shaft 19 is in the nature of a separate or individual part and is connected with the shaft 15 by a suitable keyed coupling 34. The shaft 19 passes through openings 35 and 36 in the end plates 32 and 33 respectively. An outwardly projecting boss 37 may be provided around or at the opening 35 of the plate 32, and a suitable bushing 38 may be arranged in the opening 35 to carry the shaft 19. The shaft 19 projects outwardly from the outer end plate 33 of the housing to carry the operating handle 23.

The rotor 20 is fixed or keyed on the shaft 19 within the body opening 31 and is provided to carry the brake shoes 21 and toggle means 22. The rotor 20 may be an integral member connected with the shaft 19 by keys 40. The periphery of the rotor 20 is cylindrical and has suitable clearance with the walls of the opening 31. Diametrically opposite notches or recesses 41 are provided in the rotor 20 to carry the shoes 21 and toggle means 22. The opposite end walls of the recesses 41 may be substantially radial, while their inner walls may be curved concentric with the axis of the shaft 19.

The brake shoes 21 are arcuate members arranged within the recesses 41 for co-operating with the walls of the opening 31. In the form of the invention illustrated, there is a single brake shoe 21 arranged in each recess 41. In accordance with the invention, the brake shoes 21 are somewhat shorter than the recesses 41 and are positioned to each have one end in engagement with an end wall of a recess. In the particular construction illustrated in the drawing, the points of engagement of the ends of the shoes 21 with the rotor 20 are in substantially the same diametric plane. Brake lining or friction lining 42 is provided in the outer sides of the shoes 21 to frictionally engage or brake with the walls of the opening 31. The lining 42 may be inset or recessed in the shoes 21 and may be retained in position by suitable screws 43.

The toggle means 22 flexibly connects the brake shoes 21 with the rotor 20 so that the shoes are forced into braking engagement with the walls of the opening 21 upon movement of the rotor 20 in the direction indicated by the arrow A in Fig. 3 of the drawing caused by kicking or reflex action of the brake mechanism transmitted through the shaft 15. In this manner the means 22 connects the rotor with the shoes 21 to prevent the kicking back to be transmitted to the operating handle 23. The means 22 includes toggle pins or blades 44 arranged between the rotor 20 and shoes 21. The pins or blades 22 have pivotal contact at their ends with the rotor and shoes 21 so that the rotor may have limited movement relative to the shoes. There may be two toggle pins 42 arranged between each shoe 21 and the inner wall of each recess 41. The outer ends of the pins or blades 44 are rounded and seat in rounded grooves 45 in the inner sides of the shoes 21. The inner ends of the blades 44 are also rounded and co-operate with rounded grooves 46 in the inner walls of the recesses 41. The ends of the blades or pins 44 are free to pivot in the grooves 45 and 46. The recesses 45 and 46 are related so that the toggle pins 42 are normally substantially tangential relative to the periphery of the shaft 19. The two sets of pins carried in the recesses 41 are in like or corresponding positions. It will be apparent that force transmitted from the shaft 15 to the rotor 20 turning the rotor in the direction indicated by the arrow A in Fig. 3 of the drawing tends to move the inner ends of the toggle pins 44 around toward positions where the pins will be radial, so that the shoes 21 are forced outwardly to co-operate with the walls of the opening 31. This action of the toggle pins 44 prevents or stops the kick-back or reflex movement of the shaft 15.

The invention provides means for ensuring proper contact of the shoes 21 with the walls of the body opening 31 so that they remain stationary relative to the body upon sudden and forceful movement of the rotor 20 in the direction indicated by the arrow A. Helical springs 47 are arranged under compression between the inner walls of the recesses 41 and the shoes 21 to yieldingly maintain the shoes 21 in engagement with the walls of the opening 31. The springs 47 may be spaced between the toggle blades 44 and are preferably substantially radial when the parts are in the normal position. The springs 47 may be retained in position by screws 48.

The operating handle 23 is provided to control or operate the brake mechanism and is mounted at the outer end of the housing 18. In accordance with the broader aspects of the invention, any suitable form of handle may be employed in connection with the invention. In the drawing we have shown a simple elongated handle 23 of round cross section. The handle 23 may be formed with a hub having an opening 50 for receiving the outer projecting part of the shaft 19. The sleeve 51 is free or rotatable on the shaft 19, and a bushing 52 may be provided between the sleeve and shaft. Keys 53 may be provided to operatively connect the handle 23 with the sleeve 51. A plate 54 may be provided at the outer end of the shaft 19 to retain the handle in position.

The means 24 is provided to co-operatively connect the handle 23 with the rotor 20 or the shoes 21 when it is desired to control the brake mechanism. The means 24 includes a radially projecting annular flange 60 on the sleeve 51. The sleeve 51 extends through the opening 36 in the end plate 33, and the flange 60 is provided within the opening 31. Arms 61 project from the flange 60 at diametrically opposite points to project into the recesses 41. The arms 61 extend axially through the recesses 41 at points between the free or outer ends of the shoes 21 and end walls of the recesses 41. The arms 61 are proportioned so as to have free movement or play between the ends of the shoes 21 and the end walls of the recesses.

Throughout the drawing, the parts are illustrated in a normal or neutral position. When it is desired to apply or set the brake mechanism, i. e., when it is desired to bring the brake bands 14 into braking engagement with the flanges on the drum 10, the handle 23 is operated to turn the arms 61 to engage the rotor 20 and turn it in the direction indicated by the arrow B in Fig. 3. When the handle 23 is operated in this manner, the force is applied directly to the rotor 20 to turn or operate the shafts 19 and 15. When it is desired to release the brake mechanism, the handle 23 is operated in the opposite direction to bring the arms 61 into contact with the ends of the brake shoes 21. The brake shoes are adapted to engage the rotor 20 and cause it to be turned in the direction indicated by the arrow A, so that the shafts 19 and 15 are operated to release the brake bands 14. In the event that the bands 14 bind on the drum flanges and cause a kick-back or reflex force to occur on the shaft 15, it is transmitted directly to the rotor 20 causing it to turn in the direction indicated by the arrow A. Movement of the rotor 20 in this direction relative to the housing 18 causes the inner ends of the toggle blades 44 to swing around toward positions where the blades are radial, i. e., the blades tend to straighten out and force the brake shoes 21 outwardly into tight engagement with the walls of the opening 31. This action of the toggles 44 and brake shoes 21 stops the kick-back action and prevents it from being transmitted to the handle 23. The springs 47 operate to maintain the brake shoes in engagement with the walls of the opening 31 and to yieldingly hold them against movement so that sudden turning of the rotor caused by a kick-back in the brake mechanism cannot cause shifting of the shoes.

The brake operating device provided by the present invention is simple and sturdy in construction and provides a safe and dependable means for operating the brake of a winding drum, or the like. It is to be noted that the device is in the nature of a clutch that prevents undesirable movement of the brake shaft 15 from being transmitted to the operating handle 23.

Having described only a typical preferred form of our invention, we do not wish to limit ourselves to the specific details set forth, but wish to reserve to ourselves any changes or variations that may appear to those skilled in the art or fall within the scope of the following claims.

Having described our invention, we claim:

1. In combination, the operating shaft of a brake mechanism, a stationary housing, a shaft extending completely through the housing and directly rigidly connected with the operating shaft, and means for stopping movement of said shaft transmitted to it from the operating shaft including a brake shoe for co-operating with the housing, and a toggle connection between the said shaft and shoe.

2. In combination, the operating shaft of a brake mechanism, a stationary housing, a shaft extending through the housing and connected with the operating shaft, and means for stopping movement of said shaft transmitted to it from the operating shaft including a brake shoe for co-operating with the housing, means for normally yieldingly holding the shoe in engagement with the housing, and a toggle connection between the shaft and shoe operable to force the shoe into braking engagement with the housing and rigidly connect the shaft with the shoe upon movement of the shaft in one direction.

3. In combination, the operating shaft of a brake mechanism, a stationary housing through which the shaft extends, a rotor on the shaft in the housing, and means for stopping movement of the shaft in one direction relative to the housing including a brake shoe for engaging the housing, and means for operating the shoe into braking engagement with the housing and for connecting the rotor with the shoe to hold it against movement relative to the shoe in said direction, said last-mentioned means including a toggle pin arranged between the rotor and shoe.

4. In combination, the operating shaft of a brake mechanism, a stationary housing through which the shaft extends, a rotor on the shaft in the housing, and means for stopping movement of the shaft in one direction relative to the housing including a brake shoe for engaging the housing, and means for operating the shoe into braking engagement with the housing and for connecting the rotor with the shoe to hold it against movement relative to the shoe in said direction including a toggle arranged between the shoe and rotor and normally substantially tangential to a circle concentric to the shaft.

5. In combination, the operating shaft of a brake mechanism, a stationary housing through which the shaft extends, a rotor on the shaft in the housing, and means for stopping movement of the shaft in one direction relative to the housing including a brake shoe for engaging the housing, a toggle pin between the rotor and shoe operable to force the shoe into braking engagement with the housing upon movement of the rotor in one direction relative to the shoe caused by movement of the shaft, and manually operable means for operating the shaft.

6. In a brake mechanism, an operating shaft, a housing through which the shaft extends, means for turning the shaft to operate the mechanism, and means in the housing for preventing movement of the shaft caused by reflex action of the mechanism from affecting said operating means, said means including an element on the shaft within the housing to be engaged by the operating means, a brake shoe for co-operating with the walls of the housing, and a toggle pin arranged between the element and the shoe positioned relative to the axis of rotation of the shaft to cause actuation of the brake shoe upon reflex movement of the shaft.

7. In a brake mechanism, an operating shaft, a housing through which the shaft extends, means for turning the shaft to operate the mechanism, and means in the housing for preventing movement of the shaft caused by reflex action of the mechanism from affecting said operating means, said means including an element on the shaft within the housing to be engaged by the operating means to turn the shaft in one direction, a brake shoe for co-operating with the walls of the housing and engageable by the operating means to co-operate with the element and turn the shaft in the other direction, and a toggle pin having pivotal engagement with the element and brake shoe and positioned relative to the axis of rotation of the shaft to cause actuation of the shoe upon turning of the shaft caused by reflex action of the mechanism.

8. In a brake mechanism, an operating shaft, a housing through which the shaft extends, means for turning the shaft to operate the mechanism, and means in the housing for preventing movement of the shaft caused by reflex action of the mechanism from affecting said operating means, said means including an element on the shaft within the housing to be engaged by the operating means to turn the shaft in one direction, a brake shoe for co-operating with the walls of the housing and engageable by the operating means to co-operate with the element and turn the shaft in the other direction, and spaced toggle pins having pivotal engagement with the element and shoe and arranged substantially tangential to a circle concentric with the axis of rotation of the shaft to cause actuation of the shoe upon turning of the shaft caused by reflex action of the brake mechanism.

9. In a brake mechanism, an operating shaft, a housing through which the shaft extends, a sleeve free on the shaft and extending into the housing, operating means for the sleeve, a rotor on the shaft in the housing, a shoe for braking with the interior of the housing and adapted to engage the rotor, an arm carried by the sleeve for engaging the rotor to turn the shaft in one direction and for engaging the shoe to turn the rotor and shaft in the other direction, and means for preventing movement of the shaft caused by a kick-back of the brake mechanism from being transmitted to the said operating means.

10. In a brake mechanism, an operating shaft, a housing through which the shaft extends, a sleeve free on the shaft and extending into the housing, operating means for the sleeve, a rotor on the shaft in the housing, a shoe for braking with the interior of the housing and adapted to engage the rotor, an arm carried by the sleeve for engaging the rotor to turn the shaft in one direction and for engaging the shoe to turn the rotor and shaft in the other direction, and means for preventing movement of the shaft caused by a kick-back of the brake mechanism from being transmitted to the said operating means, including a toggle pin having pivotal engagement with the rotor and the shoe and positioned substantially tangential to a circle concentric with the shaft to move toward a radial position and actuate the shoe upon said movement of the shaft.

11. In a brake mechanism, an operating shaft, a housing through which the shaft extends, a sleeve free on the shaft and extending into the housing, operating means for the sleeve, a rotor on the shaft in the housing, a shoe for braking with the interior of the housing and adapted to engage the rotor, an arm carried by the sleeve for engaging the rotor to turn the shaft in one direction and for engaging the shoe to turn the rotor and shaft in the other direction, and means for preventing movement of the shaft caused by a kick-back of the brake mechanism from being transmitted to the said operating means, including a toggle pin having pivotal engagement with the rotor and the shoe and positioned substantially tangential to a circle concentric with the shaft to move toward a radial position and actuate the shoe upon said movement of the shaft and means for normally yieldingly holding the shoe in engagement with the housing.

12. In a brake mechanism, an operating shaft, a housing through which the shaft extends, a sleeve free on the shaft and extending into the housing, operating means for the sleeve, a rotor on the shaft in the housing, a shoe for braking with the interior of the housing and adapted to engage the rotor, an arm carried by the sleeve for engaging the rotor to turn the shaft in one direction and for engaging the shoe to turn the rotor and shaft in the other direction, and means for preventing movement of the shaft caused by a kick-back of the brake mechanism from being transmitted to the said operating means, including a toggle pin having pivotal engagement with the rotor and the shoe and positioned substantially tangential to a circle concentric with the shaft to move toward a radial position and actuate the shoe upon said movement of the shaft, and a spring for normally yieldingly holding the shoe in engagement with the housing.

In witness that we claim the foregoing we have hereunto subscribed our names this 10th day of March, 1931.

ERNIE LLOYD LAUNDER.
WILLIAM T. LAUNDER.